(12) United States Patent
Naito

(10) Patent No.: US 6,722,408 B2
(45) Date of Patent: *Apr. 20, 2004

(54) PNEUMATIC TIRE INCLUDING LAND PORTION HAVING ARCUATE AND CONVEX TREAD SURFACE

(75) Inventor: Yasuhiro Naito, Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,172

(22) Filed: Jan. 31, 2000

(65) Prior Publication Data

US 2002/0195182 A1 Dec. 26, 2002

(30) Foreign Application Priority Data

Jan. 29, 1999 (JP) ............................................ 11-021821

(51) Int. Cl.$^7$ ...................... B60C 11/03; B60C 11/04; B60C 105/00
(52) U.S. Cl. .............................. 152/209.14; 152/209.15
(58) Field of Search ....................... 152/209.14, 209.15, 152/454

(56) References Cited

U.S. PATENT DOCUMENTS

| 3,176,748 | A | | 4/1965 | Giebhart |
|---|---|---|---|---|
| 5,647,925 | A | * | 7/1997 | Sumiya et al. |
| 5,660,652 | A | * | 8/1997 | Young et al. |
| 5,769,978 | A | * | 6/1998 | Lurois |
| 6,082,424 | A | * | 7/2000 | Miyazaki |
| 6,116,309 | A | * | 9/2000 | Gillard et al. |

FOREIGN PATENT DOCUMENTS

| FR | 2 665 121 | | 1/1992 |
|---|---|---|---|
| GB | 1549347 | * | 8/1979 |
| JP | 62-295702 | * | 12/1987 |
| JP | 2-81704 | * | 3/1990 |
| JP | 2-179508 | * | 7/1990 |
| JP | 3-246104 | * | 11/1991 |
| JP | 11-151911 | * | 6/1999 |
| WO | WO92/02380 | | 2/1992 |
| WO | 00/56559 | | 9/2000 |

OTHER PUBLICATIONS

Patent Abstracts of Japan, 11245622, Sep. 14, 1999, vol. 1999, No. 14.

* cited by examiner

Primary Examiner—Steven D. Maki
(74) Attorney, Agent, or Firm—Sughrue Mion, PLLC

(57) ABSTRACT

A center rib and a second rib are formed at a tread surface of a pneumatic tire along an outer contour line L1 of a radius R1 whose center is at a tire inner side. A shoulder rib is formed at the tread surface along an outer contour line L2 of a radius R2 whose centeris at a tire inner side. A step between the outer contour line L1 and a ground contact surface of the shoulder rib decreases toward a tire transverse direction outer end portion. Accordingly, when a heavy load is applied to the pneumatic tire, due to the step between, on the one hand, the shoulder rib, and on the other hand, the center rib and the second rib, uneven wear at the second rib can be suppressed. When a light load is applied, because the step decreases toward the tire transverse direction outer end portion, uneven wear of the shoulder rib can be suppressed. The pneumatic tire exhibits excellent uneven wear resistance at all land portions formed on the pneumatic tire.

17 Claims, 2 Drawing Sheets

PNEUMATIC TIRE INCLUDING LAND PORTION HAVING ARCUATE AND CONVEX TREAD SURFACE

BACKGROUND OF THE INVENTION

1. Field of the Invention

The present invention relates to a pneumatic tire used for trucks, buses or the like, and in particular, to a pneumatic tire having excellent uneven wear resistance.

2. Description of the Related Art

In conventional pneumatic tires, various measures have been taken against uneven wear, in order to prevent uneven wear of the land portions of the tire and extend the life of the tire. Land portions are portions formed by dividing the ground-contact surface of the tire by circumferential direction grooves or lug grooves.

A conventional pneumatic tire to which a measure against uneven wear has been applied is illustrated in FIG. 2. At a pneumatic tire 100, a center rib 106, a second rib 108, and a shoulder rib 110 are formed from an equatorial plane CL along the tire transverse direction, by circumferential direction grooves 104 formed in the surface of a tread 102.

At the center rib 106 and the second rib 108 of the pneumatic tire 100, a tire radial direction distance (step) H between, on the one hand, a tire transverse direction outer contour line L3 (including the imaginary extension line) along the ground-contact surface, and on the other hand, the ground-contact surface of the shoulder rib 110, is formed so as to be constant.

The shoulder rib 110 has the step H in the direction in which the radius contracts, with respect to the second rib 108 and the center rib 106. Accordingly, when a heavy load is applied to the pneumatic tire 100, the ground contact pressure on the shoulder rib 110 is relatively small, and the ground contact pressure on the center rib 106 and the second rib 108 is equalized. Thus, uneven wear (second rib punch, center rib punch) of the center rib 106 and the second rib 108 can be prevented.

The step H is set to be no more than 0.40 times the tread thickness D at the equatorial plane CL. (The tread thickness D at the equatorial plane CL is the distance, in the radial direction of the tire, from the ground contact surface to the uppermost belt layer 112).

However, because this step H is constant along the tire transverse direction at the shoulder rib 110, there is also a step H at the tire transverse direction outer end side of the shoulder rib. Accordingly, when a usual load to a light load is applied to the pneumatic tire 100, the ground contact pressure becomes even lower at the shoulder rib, at which the ground contact pressure is relatively low as compared to the other portions of the tread when a light load is applied. A drawback arises in that the uneven wear at the outer end side of the shoulder rib is promoted.

SUMMARY OF THE INVENTION

In view of the aforementioned, an object of the present invention is to provide a pneumatic tire which exhibits superior uneven wear resistance in all of the land portions formed on the tire.

In order to achieve this object, as a first aspect of the present invention, a pneumatic tire comprising a tread surface having a plurality of grooves extending along a circumferential direction of the pneumatic tire, wherein the grooves define a plurality of land portions the land portions includes; a first land portion which, among the plurality of land portions, is formed the furthest toward a tire transverse direction outer side; and a second land portion formed adjacent to the first land portion in a tire transverse direction, wherein given that a distance, along a tire radial direction, from an imaginary extension line of a tire transverse direction outer contour line along a ground contact surface at the second land portion to a tire transverse direction inner side end portion of the first land portion is H1, that a distance, along a tire radial direction, from an imaginary extension line of a tire transverse direction outer contour line along a ground contact surface at the second land portion to a tire transverse direction outer side end portion of the first land portion is H2, and that a direction toward a tire center is positive, the relationship H1>H2 is established.

In accordance with the first aspect, a step (tire radial direction distance H1) is provided between the first land portion and the second land portion. Thus, the ground contact pressure at the first land portion is lowered relatively, and the ground contact pressures at the first land portion and the second land portion are equalized. Accordingly, even in a case in which a heavy load (a load exceeding 100% when a standard load is considered to be 100%) is applied to the tire and the ground contact pressure is greatest (compared to other portions of the tire) at the tire transverse direction end portion, i.e., the first land portion, uneven wear at the land portion at the equatorial plane side of the second land portion can be reliably prevented.

When a load which is lighter than standard load (100%) is applied (hereinafter, "light load"), in the case of an ordinary pneumatic tire, the smallest ground contact pressure is applied to the tire transverse direction end portion, and thus, there is the concern that the tire transverse direction outer side end portion of the first land portion will wear unevenly. However, in accordance with the present invention, the step H1, which is between an imaginary extension line of the outer contour line of the second land portion and a tire transverse direction inner side (second land portion side) end portion of the first land portion, and the step H2, which is between an imaginary extension line of the outer contour line of the second land portion and a tire transverse direction outer side end portion of the first land portion, are formed so as to be lower toward the outer side end portion side, i.e., H1>H2. Therefore, the decrease in ground contact pressure is suppressed more and more along the direction toward the outer side end portion of the first land portion. Accordingly, as compared to a conventional structure in which the steps are equal (i.e., H1=H2), uneven wear of the outer side end portion of the first land portion can be markedly suppressed.

Namely, by providing the step between the first land portion and the second land portion, uneven wear can be prevented from occurring at the second land portion when a heavy load is applied. Further, by forming the step between the outer contour line and the first land portion so as to decrease from the inner side end portion of the first land portion toward the outer side end portion thereof, uneven wear of the first land portion, which may be great due to the step when a light load is applied, is suppressed.

As a second aspect of the present invention, in the pneumatic tire of the first aspect, the loud portions further include a third land portion formed at a tire transverse direction inner side of the second land portion, and given that a tire radial direction depth of a circumferential direction groove formed between the second land portion and the third land portion is D, the tire radial direction distance H1 falls within the range 0<H1<0.3D.

In accordance with the second aspect, when a heavy load is applied, uneven wear of the land portion at the equatorial plane side of the second rib is prevented. When a light load is applied, uneven wear of the tire transverse direction outer end portion of the shoulder rib can be suppressed.

As a third aspect of the present invention, in the pneumatic tire of the second aspect, a first land portion the end portion of the second land portion is chamfered.

In accordance with the third aspect, when there is a step, and in particular, a large step between the first land portion and the second land portion, by chamfering the end portion, the first land portion side end portion of the second land portion can be prevented from protruding out and abutting the road surface. Therefore, uneven wear of this portion can be prevented.

DESCRIPTION OF THE PREFERRED EMBODIMENT

Figure 1:
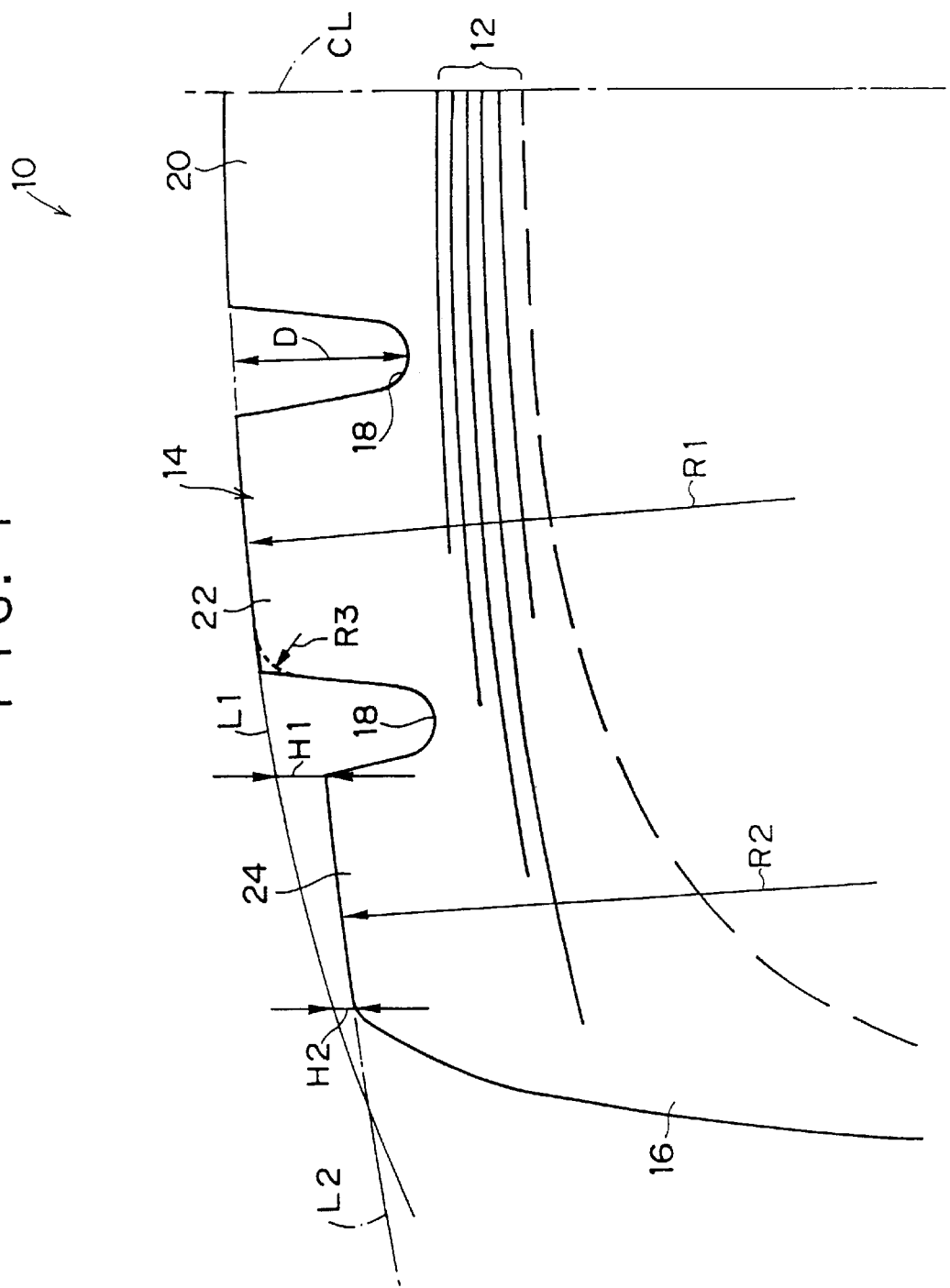
FIG. 1 is a tire transverse direction cross-sectional view of a pneumatic tire relating to a preferred embodiment of the present invention.

A pneumatic tire relating to a preferred embodiment of the present invention will be described hereinafter with reference to the drawings. FIG. 1 is a tire transverse direction cross-sectional view of a crown portion of a pneumatic tire.

As illustrated in FIG. 1, a pneumatic tire 10 comprises plural belt layers 12 which are positioned at the crown portion of a carcass (not shown) (there are five belt layers 12 in the present embodiment), a tread portion 14 which is formed at the upper portion of the belt layers 12, and shoulder portions 16 which are formed so as to be continuous with the tire transverse direction end portions of the tread portion 14.

A plurality of circumferential direction grooves 18, which extend along the circumferential direction, are formed in the surface of the tread portion 14. Accordingly, at the surface of the tread portion 14, a center rib 20, a second rib (second land portion) 22, and a shoulder rib (first land portion) 24, which are divided by the circumferential direction grooves 18, are formed in order from the tire transverse direction center (equatorial plane) CL side toward the tire transverse direction (outer) end portion. (In the present embodiment, ribs are formed. However, a block pattern including lug grooves which extend along the tire transverse direction may also be used.)

The ground contact configuration at the tire transverse direction cross-section of the center rib 20 and the second rib 22 is along an arcuate outer contour line L1 having a radius R1 with the center being the tire inner side. On the other hand, the ground contact configuration at the tire transverse direction cross-section of the shoulder rib 24 is along an arcuate outer contour line L2 having a radius R2 with the center being the tire inner side. The point of intersection of the outer contour lines L1, L2 (including the imaginary extension lines) is at the tire transverse direction outer side of the shoulder rib 24.

Accordingly, at the shoulder rib 24, the tire radial direction distance (step) between the outer contour line L1 and the outer contour line L2 at the second rib 22 side end portion of the shoulder rib 24 (hereinafter called the "shoulder rib inner end portion") is H1. The tire radial direction distance (step) between the outer contour line L1 and the outer contour line L2 at the tire transverse direction outer side end portion of the shoulder rib 24 (hereinafter called the "shoulder rib outer end portion") is H2. Comparing these two values, it can be seen that H1>H2. Namely, the shoulder rib 24 is formed such that the step decreases toward the outer end portion side thereof.

The tire radial direction depth of the circumferential direction groove 18 formed between the center rib 20 and the center rib 22 is D. It is preferable that the step H1 is formed to fall in the range 0<H1<0.3D. Further, it is preferable that the step H1 is 0.3 mm or less.

If the step H1 is such that H1<0, i.e., if H1 is negative, when a heavy load is applied, the ground contact pressure at the shoulder rib (the first land portion) 24 will be even higher, and uneven wear will progress from the second rib 22 (second land portion) toward the center rib 20 (the land portion at the equatorial plane side).

On the other hand, if the step H1 exceeds 0.3D, the step is too large. The degree of rectangularity at the shoulder rib 24 inner end side will decrease relatively, and there is the possibility that uneven wear will be caused at this portion. Here, the "degree of rectangularity" is the ratio (X1/X2) of the ground contact length (X1) at the shoulder rib inner end side to the ground contact length (X2) of the center rib 20 in a case in which the tire circumferential direction lengths (ground contact lengths) of the respective land portions are measured by using the footprint as the ground contact configuration of the tire.

The outer contour lines L1, L2 are measurements, taken by a laser configuration measuring device, of the configuration at the time when the pneumatic tire 10 is mounted to a standard rim and is inflated to standard pressure (dual). Here, "standard" in "standard rim" and "standard" in "standard pressure" are as defined by TRA (The Tire and Rim Association Inc.) or ETRTO (The European Tire and Rim Technical Organization).

Effects of the pneumatic tire 10 having the above-described structure will be discussed hereinafter.

When a load (hereinafter, "heavy load") which is at least 100% of standard load is applied to an ordinary pneumatic tire, generally, the greatest ground contact pressure, relative to other portions of the tire, will be applied to the tire transverse direction end portions.

However, in the pneumatic tire 10 of the present embodiment, because there is the step H1 between the second rib 22 and the shoulder rib 24, the ground contact pressure at the shoulder rib 24, at which the ground contact pressure is higher than the other portions when a heavy load is applied, decreases, and the ground contact pressure is equalized from the center rib 20 to the shoulder rib 24. Accordingly, uneven wear (center rib punch, second rib punch) of the center rib 20 and the second rib 22 (i.e., the land portion which is at the equatorial plane side of the second land portion) is suppressed.

When a load (hereinafter, "light load") which is less than 100% of standard load is applied, at an ordinary pneumatic tire, generally, a ground contact pressure which is smaller than that at other portions of the tire will be applied to the tire transverse direction end portions.

However, in the pneumatic tire 10 of the present embodiment, the steps H1, H2 between the outer contour line L1 and the outer contour line L2 are formed so as to decrease toward the shoulder rib 24 outer end portion side. Therefore, the ground contact pressure at the outer side end portion of the shoulder rib 24, which is where the ground contact pressure is lower than the other portions at the time a light load is applied, is higher than a case in which the steps are constant. Thus, the ground contact pressure is equalized from the center rib 20 to the shoulder rib 24. As a result, even though a step is provided between the shoulder rib 24 and the second rib 22, uneven wear of the shoulder rib (the first land portion) can be reliably suppressed.

In order to compensate for the low ground contact pressure at the outer side end portion of the shoulder rib 24 when a light load is applied, the point of intersection of the outer contour line L1 and the outer contour line L2 may be positioned above the shoulder rib 24 (between the inner end portion and the outer end portion), i.e., H2 may have a negative value. In this way, the ground contact pressure when a light load is applied is equalized even more in the tire transverse direction, and uneven wear in a vicinity of the outer side end portion of the shoulder rib 24 can be suppressed even more.

If the shoulder rib side end portion of the second rib 22 is chamfered (e.g., chamfered at the curvature R3 as shown by the dashed line in FIG. 1), uneven wear of the shoulder rib side end portion of the second rib 22 can be suppressed even more.

EXAMPLES

In order to confirm the above-described effects, experiments were conducted under the following conditions.

TABLE 1

|  | Comp. Ex. 2 | Example | Comp. Ex. 1 |
| --- | --- | --- | --- |
| H1 | 1 | 1.2 | 0 |
| H2 | 1 | −0.3 | 0 |
| R1 | 660 | 660 | 660 |
| R2 | — | ∞ | — |
| R3 | — | 190 | — |

The configuration of the Example Tire was substantially similar to that of the tire of the above described embodiment (see FIG. 1) (with the shoulder rib side end portion of the second rib 22 being chamfered to R3). However, the point of intersection of the outer contour lines L1, L2 was positioned above the shoulder rib 24. Namely, the step H2 was negative.

Figure 2:
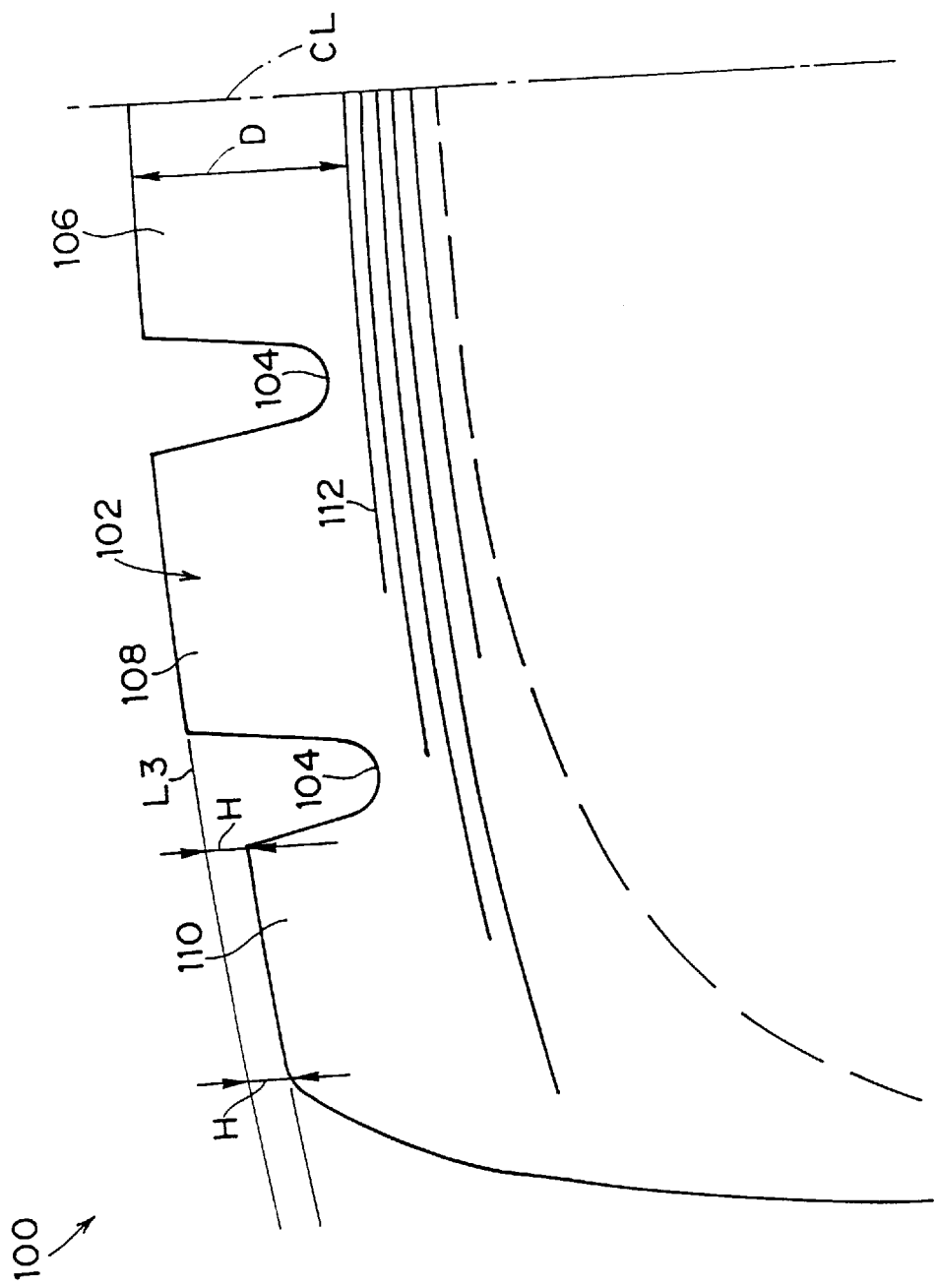
FIG. 2 is a tire transverse direction cross-sectional view of a pneumatic tire relating to a conventional example.

The configuration of the Comparative Example 1 Tire was a configuration in which there was no step between the second rib and the shoulder rib. The configuration of the Comparative Example 2 Tire was such that the steps were constant, in the same way as the tire configuration of the above-described conventional example (see FIG. 2).

The tire size of each tire was 305/75R24.5.

The configuration when the tire was mounted to a standard rim (9.00×24.5) and inflated to standard internal pressure (dual, 8.2 kgf/cm$^2$) was measured by a laser configuration measurement device and used as the outer contour configuration. The footprint with the tire inflated to standard internal pressure (dual) and with a load of 85% of standard load applied thereto was measured and used as the ground contact configuration. For the actual road test (on-road test), the tires were mounted to standard rims, filled to standard internal pressures, and run on an actual road with a with a usage load of 2800 kgf applied thereto. The uneven wear of the shoulder rib and the second rib were evaluated after running for 10,000 km, 30,000 km, 50,000 km, 100,000 km, and 150,000 km.

The rim herein was a standard rim (or "approved rim" or "recommended rim") corresponding to the size of the radial ply tire determined in accordance with standards. The internal pressure was the air pressure corresponding to the maximum load of a single wheel (maximum loadability) at an appropriate size determined in accordance with the following standards. The load was the maximum load of a single wheel (maximum loadability) at an appropriate size determined in accordance with the following standards.

These standards are determined in accordance with the industrial standards valid for the geographical region in which the tire is manufactured or used. For example, in the USA, the standards are "The Yearbook of The Tire and Rim Association, Inc.". In Europe, the standards are "The Standards Manual of The European Tire and Rim Technical Organization". In Japan, the standards are the "JAMA Yearbook" of the Japan Automobile Tire Association.

The results of the tests are shown in Table 2. Uneven wear resistance was calculated on the basis of the reciprocal of the amount of uneven wear, and is expressed as an index with the uneven wear resistance of Comparative Example 1 Tire being 100. The higher the index, the better the uneven wear resistance of the tire.

TABLE 2

| On-Road Evaluation | Comp. Ex. 2 | Example | Comp. Ex. 1 |
| --- | --- | --- | --- |
| second rib | 110 | 110 | 100 |
| shoulder rib | 90 | 100 | 100 |

In the Example Tire, because a step was provided between the shoulder rib and the second rib, which was different than the Comparative Example 1 Tire, the Example Tire exhibited improved uneven wear resistance of the second rib. Further, in the Example Tire, the outer contour line of the second rib and the outer contour line of the shoulder rib intersected above the shoulder rib. It was confirmed that, due to that structure, the uneven wear resistance of the shoulder rib could also be maintained. Namely, by providing the step, the uneven wear resistance of the second rib improved. Due to the steps becoming smaller from the shoulder rib inner end portion toward the shoulder rib outer end portion, uneven wear of the shoulder rib which would be promoted by the step was suppressed.

The present invention provides a pneumatic tire in which, when a heavy load is applied, uneven wear of the land portion at the equatorial plane side of the second rib can be prevented, and when a light load is applied, uneven wear of the tire transverse direction end portion side of the shoulder rib can be suppressed.

What is claimed is:

1. A pneumatic tire comprising a tread surface having a plurality of grooves extending along a circumferential direction of the pneumatic tire, wherein the grooves define a plurality of land portions, said land portions including:

a first land portion, which, among the plurality of land portions, is formed the furthest toward a tire transverse direction outer side; and a second land portion formed adjacent to said first land portion in a tire transverse direction, wherein the tread surface at a transverse direction cross-section of the first land portion is arcuate and convex given that a distance, along a tire radial direction, from an imaginary extension line of a tire transverse direction outer contour line along a ground contact surface at said second land portion to a tire transverse direction inner side end portion of said first land portion is H1, that a distance, along a tire radial direction, from an imaginary extension line of a tire transverse direction outer contour line along a ground contact surface at said second land portion to a tire transverse direction outer side end portion of said first land portion is H2, and that a direction radially toward a tire center is positive, the relationship H1>H2 and the relationship H1>0 and H2>0 are both established.

2. A pneumatic tire according to claim 1, wherein the distances H1 and H2 are set such that when a heavy load which is greater than a standard load is applied to said pneumatic tire, a ground contact pressure at said first land portion decreases so that ground contact pressures at said first land portion and said second land portion are substantially equalized.

3. A pneumatic tire according to claim 2, wherein said land portions further include a third land portion formed at a tire transverse direction inner side of said second land portion, and given that a tire radial direction depth of a circumferential direction groove formed between said second land portion and said third land portion is D, the tire radial direction distance H1 falls within the range 0<H1<0.3D.

4. A pneumatic tire according to claim 3, wherein H1 is 0.3 mm or less.

5. A pneumatic tire according to claim 4, wherein a first land portion side end portion of said second land portion is chamfered.

6. A pneumatic tire according to claim 1, wherein the distances H1 and H2 are set such that when a light load, which is lighter than a standard load, is applied to said pneumatic tire, a decrease in ground contact pressure at said first land portion is suppressed in a direction more from an inner end portion of said first land portion toward an outer end portion of said first land portion.

7. A pneumatic tire according to claim 6, wherein said land portions further include a third land portion formed at a tire transverse direction inner side of said second land portion, and given that a tire radial direction depth of a circumferential direction groove formed between said second land portion and said third land portion is D, the tire radial direction distance H1 falls within the range 0<H1<0.3D.

8. A pneumatic tire according to claim 7, wherein H1 is 0.3 mm or less.

9. A pneumatic tire according to claim 8, wherein a first land portion side end portion of said second land portion is chamfered.

10. A tire tread for use on a pneumatic tire having outer sides, the tire tread comprising a surface including:

a plurality of circumferentially extending grooves in the surface of the tread; and a plurality of land portions defined by the grooves, each land portion including inner and outer side ends and a ground contact surface extending along a contour line, wherein one of the land portions is located proximate an outer side of the tire, separated from another land portion of the land portions by a groove, and a radial distance, (H1) from the inner side end of said one land portion to an extension of the contour line for said another land portion over the inner side end of said one land portion, is greater than a radial distance (H2) from the outer side end of said one land portion to an extension of the contour line of said another land portion over the outer side end of said one land portion, and when a direction radially toward a tire center is indicated positive, the relationship H1>H2, and the relationship H1>0 and H2>0 are both established, and the surface of the tread at a transverse direction cross-section of said one land portion is arcuate and convex.

11. A pneumatic tire comprising a tread surface having a plurality of grooves extending along a circumferential direction of the pneumatic tire, wherein the grooves define a plurality of land portions, said land portions including:

a first land portion which, among the plurality of land portions, is formed the furthest toward a tire transverse direction outer side; and a second land portion formed adjacent to said first land portion in a tire transverse direction, wherein given that a distance, along a tire radial direction, from an imaginary extension line of a tire transverse direction outer contour line along a ground contact surface at said second land portion to a tire transverse direction inner side end portion of said first land portion is H1, that a distance, along a tire radial direction, from an imaginary extension line of a tire transverse direction outer contour line along a ground contact surface at said second land portion to a tire transverse direction outer side end portion of said first land portion is H2, and that a direction toward a tire center is positive, the relationships H1>0 and H2<0 are established, and a tread surface at a transverse direction cross-section of said first land portion is arcuate and convex wherein a first land portion side end portion of said second land portion is chamfered, and said tire transverse direction inner side end portion of said first land portion is not champered.

12. A pneumatic tire according to claim 11, wherein the distance H1 is set that when a heavy load which is greater than a standard load is applied to said pneumatic tire, a ground contact pressure at said first land portion decreases so that ground contact pressures at said first land portion and said second land portion are substantially equalized.

13. A pneumatic tire according to claim 12, wherein the distances H1 and H2 are set such that when a light load, which is lighter than a standard load is applied to said pneumatic tire, a decrease in ground contact pressure at said first land portion is suppressed in a direction more from an inner end portion of said first land portion toward an outer end portion of said first land portion.

14. A pneumatic tire according to claim 13, wherein H1 is 0.3 mm or less.

15. A pneumatic tire according to claim 11, wherein the distances H1 and H2 are set such that when a light load which is smaller than a standard load is applied to said pneumatic tire, ground contact pressure in a vicinity of an inner end portion of said first land portion decreases, the decrease in ground contact pressure becomes less pronounced towards an outer end portion of said first land portion, and the decrease in ground contact pressure terminates at the outer end portion of the first land portion.

16. A pneumatic tire according to claim 15, wherein said land portions further include a third land portion formed at a tire transverse direction inner side of said second land portion, and given that a tire radial direction depth of a circumferential direction groove formed between said second land portion and said third land portion is D, the tire radial direction distance H1 falls within the range 0<H1<0.3D.

17. A pneumatic tire according to claim 16, wherein H1 is 0.3 mm or less.

* * * * *